US012441483B2

United States Patent
Li et al.

(10) Patent No.: US 12,441,483 B2
(45) Date of Patent: Oct. 14, 2025

(54) SYSTEMS AND METHODS FOR CONTROLLING AN AIRCRAFT USING DISSIMILAR AIR DATA

(71) Applicant: THE BOEING COMPANY, Arlington, WA (US)

(72) Inventors: Sherwin Chunshek Li, Edmonds, WA (US); Ryan L. Pettit, Snohomish, WA (US); Bryan A. Lopez, Seattle, WA (US); Robert Erik Freeman, Seattle, WA (US); Melville D. W. McIntyre, Mercer Island, WA (US); Leonard J. Inderhees, Bothell, WA (US); Russell T. Bridgewater, Monroe, WA (US)

(73) Assignee: The Boeing Company, Arlington, VA (US)

( * ) Notice: Subject to any disclaimer, the term of this patent is extended or adjusted under 35 U.S.C. 154(b) by 208 days.

(21) Appl. No.: 18/171,707

(22) Filed: Feb. 21, 2023

(65) Prior Publication Data
US 2024/0278927 A1 Aug. 22, 2024

(51) Int. Cl.
*G01P 13/02* (2006.01)
*B64D 45/00* (2006.01)

(52) U.S. Cl.
CPC .......... *B64D 45/00* (2013.01); *G01P 13/025* (2013.01); *B64D 2045/0085* (2013.01)

(58) Field of Classification Search
None
See application file for complete search history.

(56) References Cited

U.S. PATENT DOCUMENTS

| 5,001,638 | A | | 3/1991 | Zimmerman | |
|---|---|---|---|---|---|
| 5,222,065 | A | * | 6/1993 | Krogmann | G06F 11/1695 714/E11.143 |
| 10,235,523 | B1 | * | 3/2019 | Keller, III | G06F 13/4282 |
| 10,850,868 | B1 | * | 12/2020 | Habboub | B64D 45/00 |
| 11,385,632 | B2 | * | 7/2022 | Whitehead | G05D 1/0055 |
| 2003/0050766 | A1 | * | 3/2003 | Cronin | G01P 13/025 702/181 |
| 2010/0100260 | A1 | * | 4/2010 | McIntyre | G01P 5/16 701/6 |
| 2012/0123704 | A1 | * | 5/2012 | Golly | G01P 21/025 702/50 |

(Continued)

FOREIGN PATENT DOCUMENTS

WO WO-2024091629 A1 * 5/2024 ............ B64D 45/00

OTHER PUBLICATIONS

Extended European Search Report for EP 23214324.8-1001, dated May 28, 2024.

*Primary Examiner* — Kenneth M Dunne
(74) *Attorney, Agent, or Firm* — Joseph M. Butscher; The Small Patent LAw Group LLC (57) ABSTRACT

A system and a method include air data sensors configured to detect one more characteristics of air surrounding an aircraft. At least three of the air data sensors differ in type. The air data sensors are configured to output air data. A flight control unit is in communication with the air data sensors. The flight control unit is configured to receive the air data from the air data sensors and control at least one aspect of the aircraft based on at least a portion of the air data. In at least one example, the flight control unit is further configured to vote in relation to the air data from the air data sensors.

20 Claims, 4 Drawing Sheets

(56) References Cited

U.S. PATENT DOCUMENTS

| | | | |
|---|---|---|---|
| 2013/0253859 A1* | 9/2013 | Freeman | G05B 23/0205 |
| | | | 702/58 |
| 2017/0276790 A1* | 9/2017 | Lodden | G01S 17/86 |
| 2019/0346279 A1 | 11/2019 | Sly | |
| 2020/0201312 A1 | 6/2020 | Whitehead | |
| 2020/0201359 A1* | 6/2020 | Burghardt | G01C 21/1654 |
| 2023/0356730 A1* | 11/2023 | Schmidt | G01L 3/102 |

* cited by examiner

SYSTEMS AND METHODS FOR CONTROLLING AN AIRCRAFT USING DISSIMILAR AIR DATA

FIELD OF THE DISCLOSURE

Examples of the present disclosure generally relate to systems and methods for controlling an aircraft, and more particularly to systems and methods for controlling an aircraft using dissimilar air data from different air data sensors.

BACKGROUND OF THE DISCLOSURE

Aircraft are used to transport passengers and cargo between various locations. Known aircraft include air data sensors that detect certain characteristics of air surrounding the aircraft. Air data from the air data sensors can be used to control operation of the aircraft. However, under certain circumstances, the air data may not be reliable. For example, if the air data sensors are struck by a bird as the aircraft is in flight, the air data sensors may provide unreliable air data. As another example, during icing conditions, the air data sensors may also provide unreliable air data. In such circumstances, a pilot of the aircraft may be required to manually operate and land the aircraft at an airport as soon as possible with incorrect and potentially misleading information about the state of the flight of the aircraft, as well as with degraded system operation.

In general, modern aircraft include fairly robust air data systems. Again though, the air data systems can be affected by external threats, such as icing, bird-strikes, volcanic ash, and the like. Such threats can potentially corrupt all air data sensors at the same time. Thus, despite redundancy, an external threat can potentially corrupt all measurements at once, typically called a common-cause event. In some known aircraft, pilots would be presented with multiple sources of airspeed and altitude, and they would have to decide which information to trust if something appeared wrong. In more recent aircraft, software performs comparison monitoring and voting to present a pilot with a trusted measurement. However, if all the measurements are wrong, there is no way to provide accurate information. Such monitoring systems can then flag data as erroneous or unreliable.

Nevertheless, even if such errors can be detected, known systems may only indicate that the data is invalid. Thus, a pilot can be informed of erroneous data, but then typically has to revert to simpler backup control laws, which may sacrifice one or more safety enhancing functions.

SUMMARY OF THE DISCLOSURE

A need exists for an improved system and a method for operating an aircraft using air data from air data sensors. Further, a need exists for a system and a method that ensure accurate and reliable air data is received from air data sensors. Also, a need exists for an improved system and method for providing air data to flight crew and aircraft systems.

With those needs in mind, certain examples of the present disclosure provide a system including air data sensors configured to detect one more characteristics of air surrounding an aircraft. At least three of the air data sensors differ in type. In at least one example, at least three of the air data sensors differ in type. The air data sensors are configured to output air data. A flight control unit is in communication with the air data sensors. The flight control unit is configured to receive the air data from the air data sensors and control at least one aspect of the aircraft based on at least a portion of the air data.

In at least one example, the flight control unit is further configured to vote in relation to the air data from the air data sensors. For example, the flight control unit is configured to vote in relation to redundant signals by selecting a mid-value to prevent an errant signal from affecting a voted output.

In at least one example, the flight control unit is configured to vote redundant measurements of each type of air data sensor, and provide multiple voted signals of a given parameter to determine if any of the voted signals are corrupted. In at least one example, the flight control unit is configured to select the types of air data sensors that behave differently in a presence of different threats in response to at least two of the types being corrupted. In at least one example, the flight control unit is configured to determine that a majority of the air data sensors are corrupted when none of the air data matches. In at least one example, the flight control unit is configured to vote by voting two types of the air data sensors, and reserving a third type of the air data sensors as a monitoring signal.

The system can also include a display that shows the air data.

In at least one example, the air data sensors include one or more first flush mounted pressure sensors, one or more multi-function probes (MFPs), one or more pitot probes, one or more angle of attack (AOA) vanes, and one or more second flush mounted pressure sensors. As a further example, the one or more first flush mounted pressure sensors include a pair of first flush mounted pressure sensors that can be symmetrical with respect to a central longitudinal plane of the aircraft. As a further example, the one or more MFPs include a pair of MFPs that can be about symmetrical with respect to the central longitudinal plane of the aircraft. As a further example, the one or more pitot probes include a pair of pitot probes that can be about symmetrical with respect to the central longitudinal plane of the aircraft. As a further example, the one or more AOA vanes include a pair of AOA vanes that can be about symmetrical with respect to the central longitudinal plane of the aircraft. As a further example, the one or more second flush mounted pressure sensors include one or more pairs of second flush mounted pressure sensors that can be about symmetrical with respect to the central longitudinal plane of the aircraft. In at least one other example, the pairs of air data sensors may not be symmetrical with respect to the central longitudinal plane of the aircraft.

The air data sensors can also include one or more total air temperature (TAT) probes.

In at least one example, the one or more first flush mounted pressure sensors, the one or more MFPs, the one or more AOA vanes, and the one or more second flush mounted pressure sensors are not coupled to pneumatic connections.

Certain examples of the present disclosure provide a method including detecting, by air data sensors, one more characteristics of air surrounding an aircraft, wherein at least three of the air data sensors differ in type, and wherein the air data sensors are configured to output air data; receiving, by a flight control unit in communication with the air data sensors, the air data from the air data sensors; and controlling, by the flight control unit, at least one aspect of the aircraft based on at least a portion of the air data.

The method can also include voting, by the flight control unit, in relation to the air data from the air data sensors. The method can also include showing the air data on a display.

Certain examples of the present disclosure provide an aircraft including air data sensors, and a flight control unit, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Figure 1:
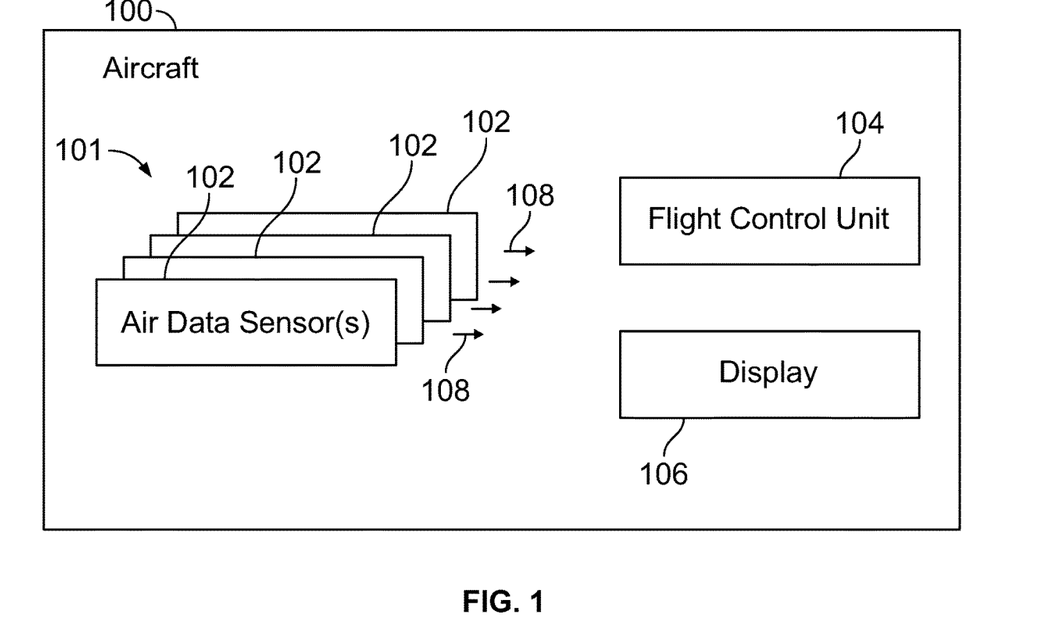
FIG. 1 illustrates a simplified block diagram of an aircraft, according to an example of the present disclosure.

FIG. 1 illustrates a simplified block diagram of an aircraft 100, according to an example of the present disclosure. The aircraft 100 includes a system 101 including air data sensors 102 in communication with a flight control unit 104, and a display 106 through one or more wired or wireless connections. In at least one example, the air data sensors 102 include one or more multi-function probes, one or more flush mounted pressure sensors, one or more angle of attack vanes, one or more total air temperature probes, and/or the like. The air data sensors 102 output air data 108, which is received by the flight control unit 104 and the display 106.

In at least one example, at least two of the air data sensors 102 differ in type from one another (for example, multi-function probes differ in type from flush mounted pressure sensors, angle of attack vanes, and total air temperature probes). As such, the air data sensors 102 can be dissimilar, and output dissimilar air data 108. Because the air data sensors 102 are of different types, the air data sensors 102 behave and react differently to external threats, such as bird strikes, icing, and the like. The different air data sensors 102 sense air parameters in different ways, thereby providing dissimilar responses. The dissimilar response characteristics allow for sensor isolation and detection, and also increase the chances of at least one sensor type surviving a common threat exposure.

In at least one example, at least three of the air data sensors 102 differ in type from one another. With three different types of air data sensors, the flight control unit 104 can readily discern if air data from one type of air data sensor(s) 102 does not agree with air data from the other two types of air data sensor(s) 102. In at least one example, another source of air data can be an estimate derived from other sensor inputs. Alternatively, the other source can be a different air data measurement.

In at least one example, the flush mounted pressure sensors (such as first flush mounted pressure sensors and second flush mounted pressure sensors) can cooperate to provide a network of sensors that calculate different parameters (such as total pressure, angle of attack, angle of sideslip, and/or static pressure). As such, the various flush mounted pressure sensors can work together as a network or array of sensors. The number of such sensors can vary.

The flight control unit 104 is configured to operate various aspects of the aircraft 100. The flight control unit 104 can include a plurality of control units, processors, or the like that are configured to operate the various aspects of the aircraft 100. In at least one example, the flight control unit 104 is configured to control flight of the aircraft 100. For example, the flight control unit 104 can be configured to operate engines, flight control surfaces, and/or the like to control the aircraft 100 on the ground and in flight. The flight control unit 104 is configured to provide auto-pilot operation. As a further example, the flight control unit 104 is configured to assist a pilot in operating the aircraft. The flight control unit 104 receives the air data 108 from the air data sensors 102 and operates the aircraft 100 based on the air data 108.

The display 106 is an electronic monitor, such as a computer monitor, an electronic display panel, or the like, such as within a flight deck or cockpit of the aircraft 100. The display 106 receives the air data 108 from the air data sensors 102, typically via the flight control unit 104, and shows information regarding the air data 108 on the display 106. In this manner, a pilot can view the information regarding the air data on the display 106.

As described herein, the system 101 includes the air data sensors 102 configured to detect one more characteristics of air surrounding the aircraft 100. At least two of the air data sensors 102 differ in type. In other example, at least three of the air data sensors 102 differ in type. The air data sensors 102 are configured to output the air data 108. Air data 108 from different types of sensors is dissimilar. The flight control unit 104 is in communication with the air data sensors 102. The flight control unit 104 is configured to receive the air data 108 from the air data sensors 102 and control at least one aspect of the aircraft 100 based on at least a portion of the air data 108. In at least one example, the flight control unit 104 is further configured to vote regarding the air data 108 from the air data sensors 102.

Figure 2:
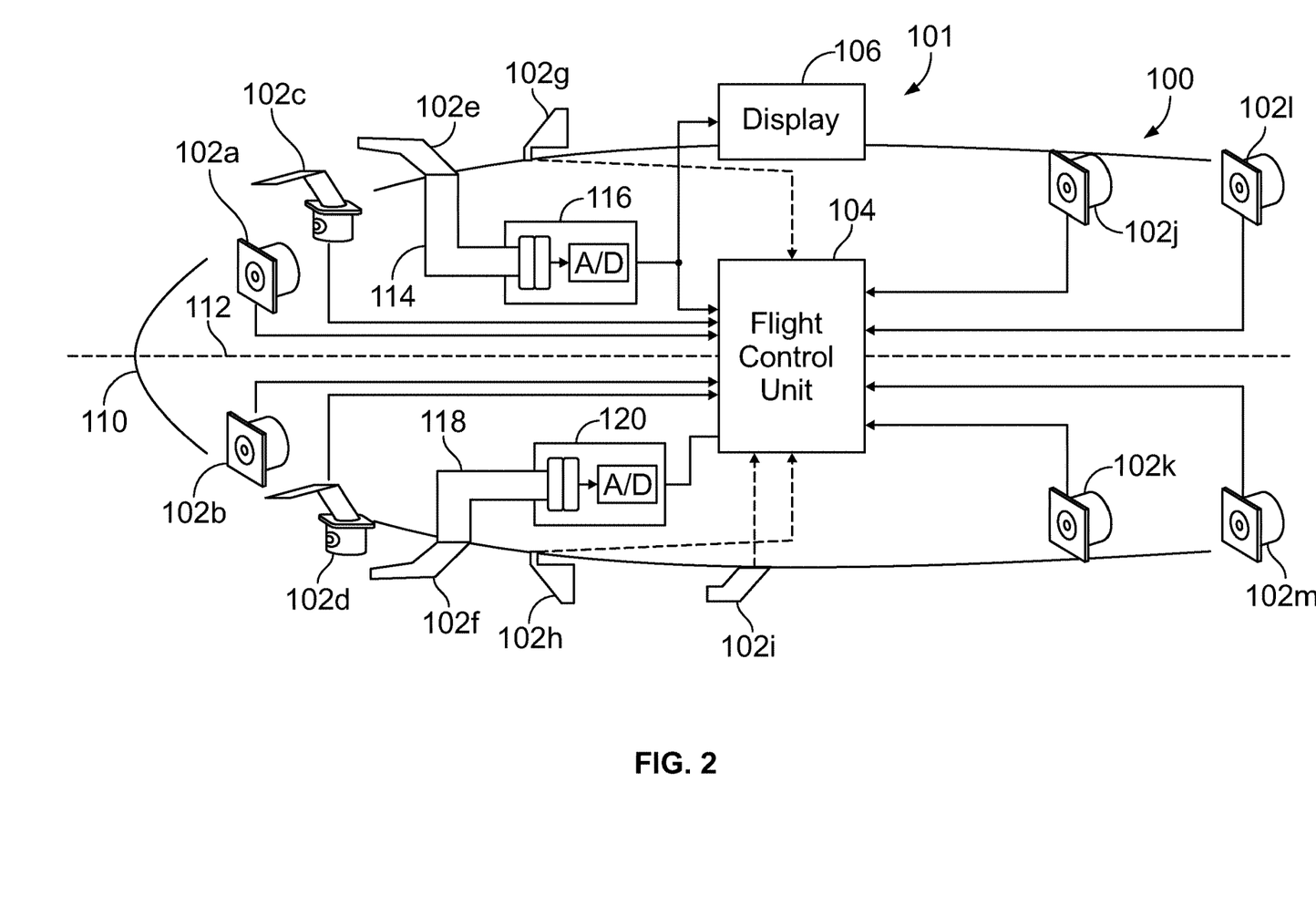
FIG. 2 illustrates a simplified schematic top view of an aircraft, according to an example of the present disclosure.

FIG. 2 illustrates a simplified schematic top view of an aircraft 100, according to an example of the present disclosure. The aircraft 100 includes numerous air data sensors. For example, the air data sensors include a pair of flush mounted pressure sensors 102a and 102b, which can be configured to measure angle of sideslip. The flush mounted pressure sensors 102a and 102b can be proximate to a nose 110 of the aircraft 100. The flush mounted pressure sensors 102a and 102b can be symmetrical with respect to a central longitudinal plane 112 of the aircraft 100. For example, the flush mounted pressure sensor 102a can be a right flush mounted pressure sensor positioned a first distance from the central longitudinal plane 112, and the flush mounted pressure sensor 102b can be a left flush mounted pressure sensor positioned a second distance from the central longitudinal plane 112, in which the second distance is the same or similar length (such as within +/−5%), but opposite from the first distance. Optionally, the distances may differ. The flush mounted pressure sensors 102a and 102b are in communication with the flight control unit 104 (and optionally the display 106) through one or more wired or wireless connections. The flush mounted pressure sensors 102*a* and 102*b* may not be coupled to pneumatic connections, thereby reducing overall weight of the aircraft 100 and improving fuel efficiency. Optionally, the flush mounted pressure sensors 102*a* and 102*b* may be coupled to external pneumatic connections.

The first pair of flush mounted pressure sensors 102*a* and 102*b* provide dissimilar air data. That is, the flush mounted pressure sensor 102*a* provides air data that differs from that of the flush mounted pressure sensor 102*b*. The air data from the flush mounted pressure sensors 102*a* and 102*b* can be similar in that each includes the same or similar sensing mechanisms.

In at least one example, the air data sensors also include at least one multi-function probe (MFP). For example, the air data sensors can include a pair of MFPs 102*c* and 102*d* that are aft from the first pair of flush mounted pressure sensors 102*a* and 102*b*. The flush mounted pressure sensors 102*a* and 102*b* can be closer to the nose 110 of the aircraft 100 than the MFPs 102*c* and 102*d*. Optionally, the first pair of flush mounted pressure sensors 102*a* and 102*b* may not be closer to the nose 110 of the aircraft 100 than the MFPs 102*c* and 102*d*. The MFPs 102*c* and 102*d* can be symmetrical with respect to the central longitudinal plane 112 of the aircraft 100. For example, the MFP 102*c* can be a right MFP positioned a third distance from the central longitudinal plane 112, and the MFP 102*d* can be a left MFP positioned a fourth distance from the central longitudinal plane 112, in which the fourth distance is the same or similar length (such as within +/−5%), but opposite from the third distance. The MFPs 102*c* and 102*d* are in communication with the flight control unit 104 (and optionally the display 106) through one or more wired or wireless connections. The MFPs 102*c* and 102*d* may not be coupled to pneumatic connections, thereby reducing overall weight of the aircraft 100 and improving fuel efficiency. The pair of MFPs 102*c* and 102*d* provide dissimilar air data from one another, as well as the first pair of flush mounted pressure sensors 102*a* and 102*b*. The air data from the MFPs 102*c* and 102*d* can be similar in that each includes the same or similar sensing mechanisms. The MFP 102*c* provides air data that differs from that of the MFP 102*d*. The MFPs 102*c* and 102*d* can be configured to operative independently and automatically, and can further be configured to operate through enhanced calibration techniques.

In at least one example, the MFPs provide air data including pitot and static pressure, air speed, angle of attack and angle of sideslip. Each MFP can include an air data computer and can be devoid of pneumatic tubing. In at least one example, the MFPs include a receiving tube having multiple openings configured to receive air. The numerous openings are configured to provide information regarding total air pressure, and pressure-based angle of attack information, as well as static air pressure.

In at least one example, the air data sensors also include a pair pitot probes 102*e* and 102*f* that can be aft from the MFPs 102*c* and 102*d* The MFPs 102*c* and 102*d* can be closer to the nose 110 of the aircraft 100 than the pitot probes 102*e* and 102*f*. The pitot probes 102*e* and 102*f* can be symmetrical (or about symmetrical, such as deviating less than 5% from symmetry) with respect to the central longitudinal plane 112 of the aircraft 100. For example, the pitot probe 102*e* can be a right pitot probe, and the pitot probe 102*f* can be a left pitot probe. The pitot probe 102*e* can be coupled to a pneumatic conduit 114 that connects to a first air data module 116, which is in communication with the flight control unit 104 (and optionally the display 106) through one or more wired or wireless connections. Optionally, the pitot probe 102*e* can include co-located electronics in which there is not a separate air data module. Similarly, the pitot probe 102*f* is coupled to a pneumatic conduit 118 that connects to a second air data module 120, which is in communication with the flight control unit 104 (and optionally the display 106) through one or more wired or wireless connections. The pair of pitot probes 102*e* and 102*f* provide dissimilar air data from one another, as well as the first pair of flush mounted pressure sensors 102*a* and 102*b* and MFPs 102*c* and 102*d*. The pitot probe 102*e* provides air data that differs from that of the pitot probe 102*f*. The air data from the pair of pitot probes 102*e* and 102*f* can be similar in that each includes the same or similar sensing mechanisms.

In at least one example, the air data sensors also include a pair of angle of attack (AOA) vanes 102*g* and 102*h* that are aft from the pitot probes 102*e* and 102*f*. The pitot probes 102*e* and 102*f* can be closer to the nose 110 of the aircraft 100 than the AOA vanes 102*g* and 102*h*. The AOA vanes 102*g* and 102*h* can be symmetrical (or about symmetrical) with respect to the central longitudinal plane 112 of the aircraft 100. For example, the AOA vane 102*g* can be a right AOA vane, and the AOA vane 102*h* can be a left AOA vane. The AOA vanes 102*g* and 102*h* are in communication with the flight control unit 104 (and optionally the display 106) through one or more wired or wireless connections. The pair of AOA vanes 102*g* and 102*h* provide dissimilar air data from one another, as well as the first pair of flush mounted pressure sensors 102*a* and 102*b*, the MFPs 102*c* and 102*d*, and the pitot probes 102*e* and 102*f*. The AOA vane 102*g* provides air data that differs from that of the AOA vane 102*h*. The air data from the pair of AOA vanes 102*g* and 102*h* can be similar in that each includes the same or similar sensing mechanisms.

In at least one example, the air data sensors also include a total air temperature (TAT) probe 102*i*, which is aft from the AOA vane 102*h* (or optionally, the AOA vane 102*g*). An additional TAT probe can also be used. The AOA vane 102*h* can be closer to the nose 110 of the aircraft 100 than the TAT probe 102*i*. Optionally, the TAT probe 102*i* can be located closer to the nose 110. The TAT probe 102*i* is in communication with the flight control unit 104 (and optionally the display 106) through one or more wired or wireless connections. The TAT probe 102*i* provides dissimilar air data (for example, different air data) from the first pair of flush mounted pressure sensors 102*a* and 102*b*, the MFPs 102*c* and 102, the pitot probes 102*e* and 102*f*, and the AOA vanes 102*g* and 102*h*. In at least one example, the TAT probe 102*i* outputs a TAT signal that is used by the flight control unit 104 to compute true airspeed based on total air pressure, and further based on static pressure detected by other air data sensors.

In at least one example, the air data sensors also include a second pair of flush mounted pressure sensors 102*j* and 102*k* that are aft from AOA vanes 102*g* and 102*h*, and a third pair of flush mounted pressure sensors 102*l* and 102*m* that are aft from the second pair of flush mounted pressure sensors 102*j* and 102*k*. The first pair of flush mounted pressure sensors 102*j* and 102*k* can be symmetrical with respect to the central longitudinal plane 112 of the aircraft 100. Further, the third pair of flush mounted pressure sensors 102*l* and 102*m* can be symmetrical with respect to the central longitudinal plane 112 of the aircraft 100. The flush mounted pressure sensors 102*j*, 102*k*, 102*l*, and 102*m* are in communication with the flight control unit 104 (and optionally the display 106) through one or more wired or wireless connections. The flush mounted pressure sensors 102*j*, 102*k*, 102*l*, and 102*m* are not coupled to pneumatic connections, thereby reducing overall weight of the aircraft 100 and improving fuel efficiency. In at least one other example, the flush mounted pressure sensors 102*j*, 102*k*, 102*l*, and 102*m* can be coupled to pneumatic connections. The flush mounted pressure sensors 102*j*, 102*k*, 102*l*, and 102*m* provide dissimilar air data from one another, as well as the first pair of flush mounted pressure sensors 102*a* and 102*b*, the MFPs 102*c* and 102, the pitot probes 102*e* and 102*f*, and the TAT probe 102*i*.

Optionally, the aircraft 100 can include more or less sensors than shown. Further, the air data sensors can be located at different areas than shown.

In operation, the flight control unit 104 receives air data from all of the air data sensors 102*a*-102*m*. The flight control unit 104 controls operation of the aircraft based on the air data received from the air data sensors 102*a*-102*m*. Information regarding the air data can be shown on the display 106, for example. Because the air data is from numerous sensors, the air data from each of the air data sensors is dissimilar. The dissimilar air data received from all of the air data sensors 102*a*-102*m* is analyzed by the flight control unit to determine reliability and accuracy. The numerous air data sensors 102*a*-102*m* provide redundancy to ensure that accurate air data is received by the flight control unit 104 from at least one of the air data sensors.

The flight control unit 104 receives the dissimilar air data from the numerous air data sensors 102*a*-102*m* and retains valid air data even in the presence of common-cause threat scenarios. In at least one example, the flight control unit 104 is configured to select one or more of the sensors 102*a*-102*m* in relation to valid air data. Because the aircraft 100 includes numerous air data sensors of different types (for example, flush mounted pressure sensors, MFPs, pitot probes, a TAT probe, and/or the like), the different types of air data sensors behave differently in the presence of air data external threats (such as bird strikes, icing, or the like), and also have different levels of exposure to corruption by each threat. That is, the dissimilar air data sensors have different weaknesses, so that for a given threat, one air data sensor may be corrupted but one or more others is not corrupted.

The flight control unit 104 receives the dissimilar air data from the numerous air data sensors 102*a*-102*m* and performs a voting operation in relation to the dissimilar air data. In at least one example, sensors of a single type can be simultaneously corrupted, but such will not affect the accuracy of the voted air data parameters. In this manner, the flight control unit 104 can also identify which sensors may be corrupted, which also leads to retaining full flight control capability and display integrity.

As an example, the flight control unit 104 receives air data from each of the MFPs 102*c* and 102*d* and can initially perform a correction in relation to such data. The flight control unit 104 can then perform an MFP triplex signal selection fault detection with respect to the air data received from the MFPs 102*c* and 102*d* regarding total air pressure, static air pressure, and angle of attack. The flight control unit 104 receives air data from all of the air data sensors 102*a*-102*m* and can perform such corrections and triple signal selection fault detections with respect to the received air data. The flight control unit 104 can perform a voting operation with respect to the dissimilar air data from the different air data sensors 102*a*-102*m*. The voting operation can include determining a middle value, with outlying values being slow rate equalized to the middle value signal. The flight control unit 104 can operate the aircraft based on the middle value, for example. If outlying values exceed a predetermined threshold, the flight control unit 104 can discard such outlying value(s). The flight control unit 104 can also identify the air data sensors from which such outlying value(s) are received. In at least one example, the flight control unit 104 performs the voting operation by the following: equalization, which seeks to remove any small, steady-state offsets in sensor measurements from corresponding outputs; source error correction, which accounts for the location of the individual sensors and performs a local-to-freestream correction; air data conversion, which takes pressure data and converts it to relevant air data parameters such as airspeed and Mach; and a redundancy management algorithm. In at least one example, rather than using a single triple system for each parameter, the flight control unit 104 uses a dual-layered voting and monitoring scheme. The first layer votes and monitors all of the air data sensors 102*a*-102*m* in pairs, based on type. For example, the flight control unit 104 votes two MFP measurements together in one voter, while two AOA vanes are voted in another voter. These two outputs from the first layer are then voted together with a synthetic estimate of angle of attack in the second layer to produce a trusted measurement of angle of attack. This dual layer voting architecture allows not only for the detection and isolation of erroneous data from a single sensor, but also successfully detects and isolates erroneous data from common sensor types without allowing the trusted output to become corrupted. In at least one example, the flight control unit 104 can modify a first layer signal selection fault detection voting scheme for angle of attack by providing a first vote with respect to vane angle of attack, a second vote with respect to MFP angle of attack, and a third vote with respect to synthetic inertial angle of attack based on pitch attitude, static pressure, and synthetic pressure.

In at least one example, the flight control unit 104 detects the signals from the air data sensors 102 and performs the voting to (1) provide air data measurements that remain accurate and undisturbed when any single air data sensor, or even all air data sensors of a given type are corrupted, and (2) ensure detection and invalidation of a given air data parameter if the majority of sensor types (for example, two out of three dissimilar sources) are corrupted at the same time in a worst-case scenario. If the signals received from the air data sensors 102 are not voted (for example, one signal was used until it was determined to be corrupted, then the voting switches to a next source), the flight control unit 104 may then determine that, for a period of time, the first corrupted data can still be used by various systems until the flight control unit 104 determines that the data is unusable and switches to other data for analysis. In at least one example, the flight control unit 104 votes in relation to redundant signals, such as by selecting a mid-value, to prevent one errant signal from affecting a voted output during the time it takes to determine one signal is unusable and flag it as erroneous.

By adding dissimilarity, more layers of measurements are added such that there is redundancy in measurements of a given sensor type, and redundancy in measurements of a given air data parameter coming from different sensor types as well. The flight control unit 104 can use various different voting schemes.

For example, the flight control unit 104 can be configured to vote the redundant measurements of each sensor type first, such as by creating a voted MFP angle of attack signal, then another voted vane angle of attack, and optionally a voted angle of attack from a flush mounted pressure sensor array if there are enough flush sensors to produce more than one AOA measurement. In this case, an erroneous signal of any one sensor does not propagate past the first voting layer. Next, since there is now a multiplicity of voted signals of a given parameter (in this example, three voted AOA measurements), those voted signals enter yet another voting layer, which prevents one voted signal from corrupting the overall voted parameter. In this example, if there are two MFP sensors and both were corrupted at the same time, the voted MFP signal may be corrupted. However, when that signal is voted with the other two sources, the signal is voted out of consideration. Because there are still two other sources of data that are still acceptable, the flight control unit 104 determines there is an acceptable measurement. If, however, two sensor types are corrupted, the flight control unit 104 can select the sensor types that behave differently in the presence of various threats, thereby ensuring that the two corrupted signals at the second layer behave differently, and hence all three signals mismatch at the second layer. Further, the flight control unit 104 can further determine that when nothing matches, a majority of sensors are corrupted and therefore there is no valid data, thereby providing a fail-safe.

In an at least one example, the first voting layer can instead vote on individual sensor outputs from dissimilar sensor types, and there can still be a second voting layer that votes the outputs of the first voting layer.

In at least one example, two sensor types can be voted, and the third sensor type can be reserved simply as a monitoring signal. As a different example, the system can include multiple MFPs, multiple flush mounted pressure sensors, and a synthetic/estimated parameter that uses an algorithm and other non-air data sensors. There can still be a first layer vote and a second layer vote, as described. However, there are only two voted signals from the first layer, and if both of those are corrupted, then the voted signal from the second layer may also be corrupted. If the second layer signal is compared to a third signal in a comparison monitor, and the two fail to match, then the flight control unit 104 can invalidate the air data signal or parameter. In such a scenario, the third signal is not a tie-breaker in the voting, but can still be used to provide the fail-safe state. In this example, the flight control unit 104 can vote same-type signals or mixed-type signals in the first layer, so either of the first two variants can be combined with this version.

In at least one other example, the flight control unit 104 can perform a super vote, in which all parameters are voted at once. In at least one example, the voting schemes do not necessarily need to have a mid-value select vote. Instead, some voting schemes can utilize an average, or can pick one and then switch if that one mis-compares from the others.

Examples of the present disclosure provide systems and methods for operating an aircraft that includes a combined use of multi-function air data probes and other air data sensors to provide dissimilar air data. Further, in at least one example, the systems and methods include the flight control unit 104 that can utilize voting algorithms to manage air data disagreements during common mode threats, thereby enabling isolation of corrupted sensors even under extreme threat environments, and hence a fail-safe operational flight control system.

Figure 3:
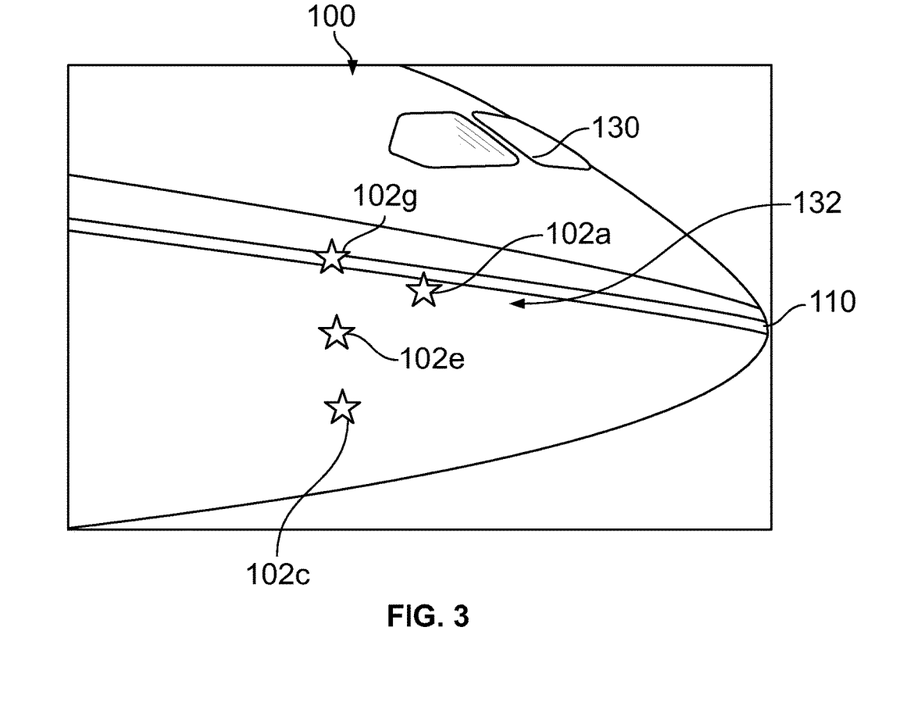
FIG. 3 illustrates a side view of a front of an aircraft, according to an example of the present disclosure.

FIG. 3 illustrates a side view of a front of an aircraft 100, according to an example of the present disclosure. The aircraft 100 includes a flight deck or cockpit 130 proximate to the nose 110. Referring to FIGS. 2 and 3, the sensors are positioned to avoid physical interference. Further, in at least one example, the AOA vanes 102g and 102h can be positioned on a half-breadth line 132, which increases local to free-stream linearity while reducing Mach and sideslip effects. The pitot probes 102e and 102f can be positioned to provide low error corrections and avoid nose gear wake. The MFPs 102c and 102d can be positioned to provide comparable static source error correction, total source error correction, and angle of attack corrections with a reduced magnification factor. The first pair of flush mounted pressure sensors 102a and 102b can be positioned to provide reduced Mach and angle of attack coupling.

Figure 4:
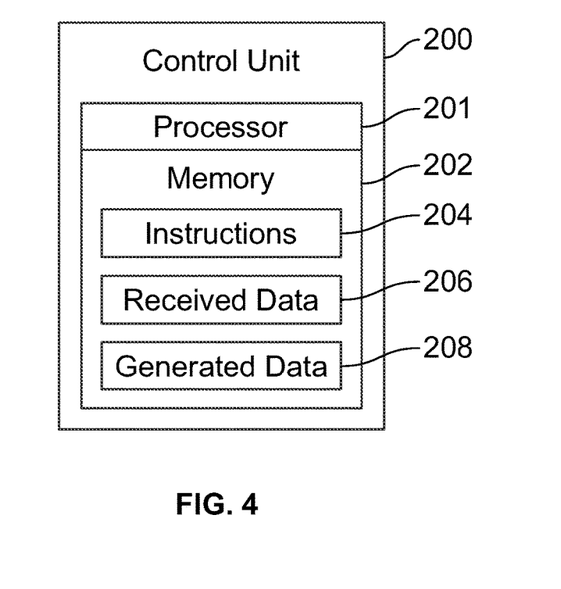
FIG. 4 illustrates a schematic block diagram of a control unit, according to an example of the present disclosure.

FIG. 4 illustrates a schematic block diagram of a control unit 200, according to an example of the present disclosure. The flight control unit 104 shown in FIGS. 1 and 2 can be configured as shown in FIG. 4. In at least one example, the control unit 200 includes at least one processor 201 in communication with a memory 202. The memory 202 stores instructions 204, received data 206, and generated data 208. The control unit 200 shown in FIG. 4 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, a quantum computer, and any other circuit or processor including hardware, software, or a combination thereof capable of executing the functions described herein. Such are exemplary only, and are thus not intended to limit in any way the definition and/or meaning of such terms. For example, the flight control unit 104 may be or include one or more processors that are configured to control operation, as described herein.

The flight control unit 104 is configured to execute a set of instructions that are stored in one or more data storage units or elements (such as one or more memories), in order to process data. For example, the flight control unit 104 may include or be coupled to one or more memories. The data storage units may also store data or other information as desired or needed. The data storage units may be in the form of an information source or a physical memory element within a processing machine.

The set of instructions may include various commands that instruct the flight control unit 104 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the flight control unit 104. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the flight control unit 104 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 5:
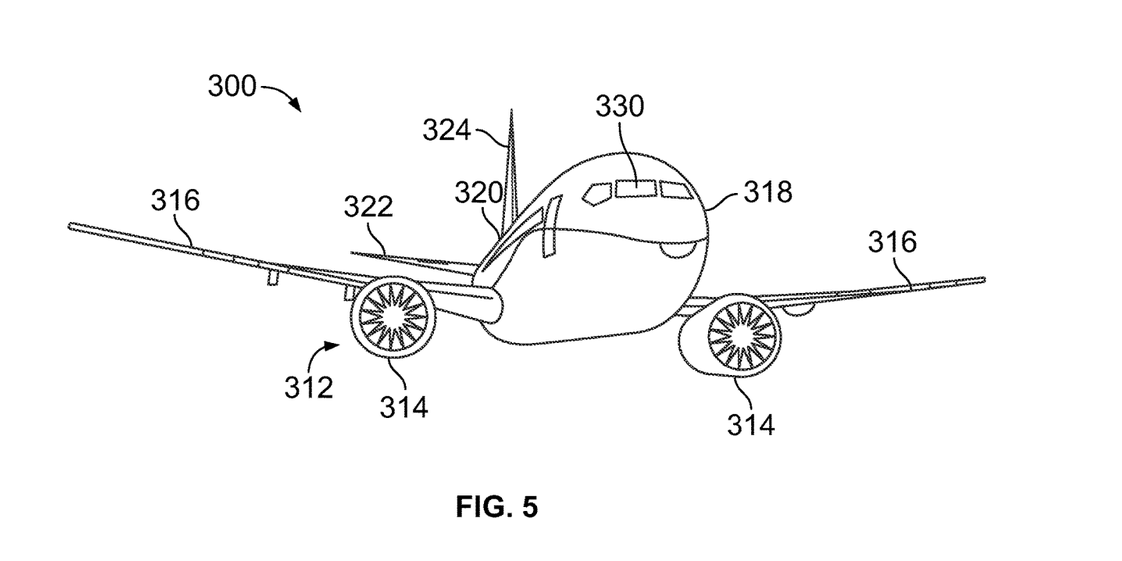
FIG. 5 illustrates a perspective front view of an aircraft, according to an example of the present disclosure.

FIG. 5 illustrates a perspective front view of an aircraft 300, according to an example of the present disclosure. The aircraft 300 is an example of the aircraft 100 shown in FIGS. 1 and 2. The aircraft 300 includes a propulsion system 312 that includes engines 314, for example. Optionally, the propulsion system 312 may include more engines 314 than shown. The engines 314 are carried by wings 316 of the aircraft 300. In other examples, the engines 314 may be carried by a fuselage 318 and/or an empennage 320. The empennage 320 may also support horizontal stabilizers 322 and a vertical stabilizer 324. The fuselage 318 of the aircraft 300 defines an internal cabin 330, which includes a flight deck or cockpit, one or more work sections (for example, galleys, personnel carry-on baggage areas, and the like), one or more passenger sections (for example, first class, business class, and coach sections), one or more lavatories, and/or the like. FIG. 5 shows an example of an aircraft 300. It is to be understood that the aircraft 300 can be sized, shaped, and configured differently than shown in FIG. 5.

Figure 6:
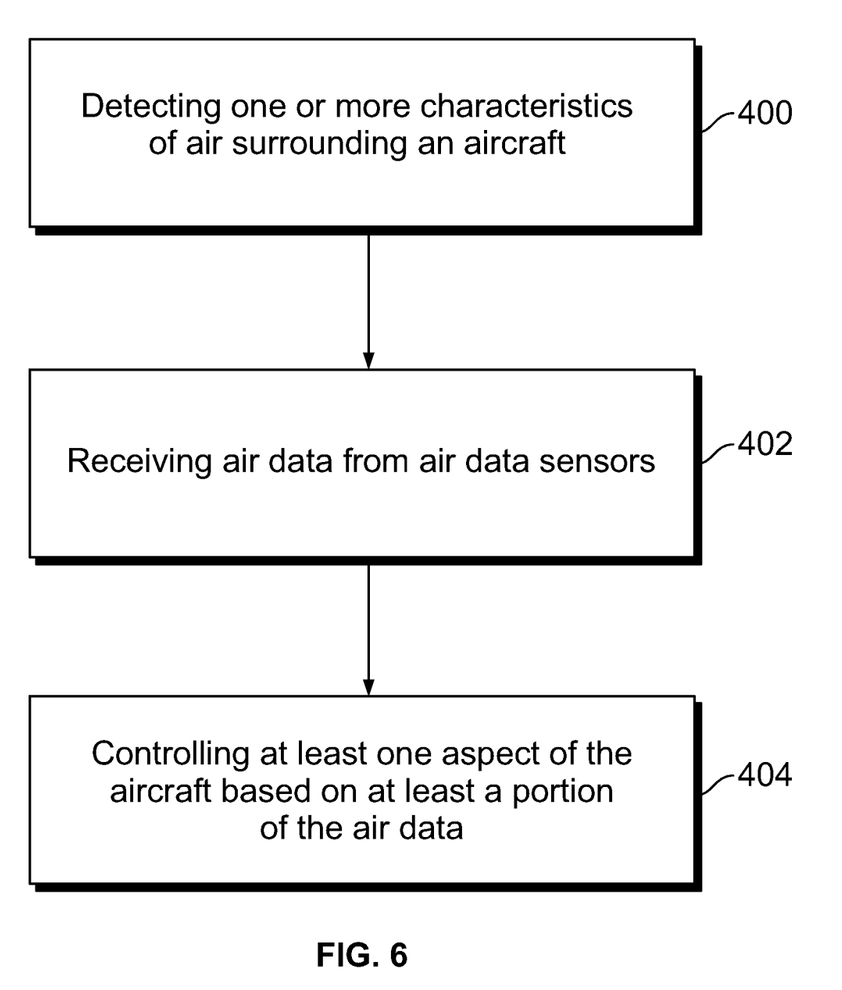
FIG. 6 illustrates a flow chart of a method, according to an example of the present disclosure.

FIG. 6 illustrates a flow chart of a method, according to an example of the present disclosure. Referring to FIGS. 1 and 6, the method includes detecting 400, by the air data sensors 102, one more characteristics of air surrounding the aircraft 100. At least two of the air data sensors 102 differ in type. The air data sensors 102 are configured to output the air data 108. The method also includes receiving 402, by the flight control unit 104 in communication with the air data sensors 102, the air data 108 from the air data sensors 102. The method also includes controlling 404, by the flight control unit 104, at least one aspect of the aircraft 100 based on at least a portion of the air data 108. In at least one example, the method also includes voting, by the flight control unit 104, in relation to the air data 108 from the air data sensors 102. The method can also include showing the air data 108 on the display 106.

Further, the disclosure comprises examples according to the following clauses:

Clause 1. A system comprising:
air data sensors configured to detect one more characteristics of air surrounding an aircraft, wherein at least three of the air data sensors differ in type, and wherein the air data sensors are configured to output air data; and
a flight control unit in communication with the air data sensors, wherein the flight control unit is configured to receive the air data from the air data sensors and control at least one aspect of the aircraft based on at least a portion of the air data;
wherein the flight control unit is further configured to vote in relation to the air data from the air data sensors.

Clause 2. The system of Clause 1, wherein the flight control unit is configured to vote in relation to redundant signals by selecting a mid-value to prevent an errant signal from affecting a voted output.

Clause 3. The system of Clauses 1 or 2, wherein the flight control unit is configured to vote redundant measurements of each type of air data sensor, and provide multiple voted signals of a given parameter to determine if any of the voted signals are corrupted.

Clause 4. The system of any of Clauses 1-3, wherein the flight control unit is configured to select the types of air data sensors that behave differently in presence of different threats in response to at least two of the types being corrupted.

Clause 5. The system of any of Clauses 1-4, wherein the flight control unit is configured to determine that a majority of the air data sensors is corrupted when none of the air data matches.

Clause 6. The system of any of Clauses 1-5, wherein the flight control unit is configured to vote by voting two types of the air data sensors, and reserving a third type of the air data sensors as a monitoring signal.

Clause 7. The system of any of Clauses 1-6, further comprising a display that shows the air data.

Clause 8. The system of any of Clauses 1-7, wherein the air data sensors comprise:
one or more first flush mounted pressure sensors;
one or more multi-function probes (MFPs);
one or more pitot probes;
one or more angle of attack (AOA) vanes; and
one or more second flush mounted pressure sensors.

Clause 9. The system of Clause 8, wherein the one or more first flush mounted pressure sensors include a pair of first flush mounted pressure sensors that are about symmetrical with respect to a central longitudinal plane of the aircraft, wherein the one or more MFPs include a pair of MFPs that are about symmetrical with respect to a central longitudinal plane of the aircraft, wherein the one or more pitot probes include a pair of pitot probes that are about symmetrical with respect to a central longitudinal plane of the aircraft, wherein the one or more AOA vanes include a pair of AOA vanes that are about symmetrical with respect to a central longitudinal plane of the aircraft, and wherein the one or more second flush mounted pressure sensors include one or more pairs of second flush mounted pressure sensors that are about symmetrical with respect to a central longitudinal plane of the aircraft.

Clause 10. The system of Clauses 8 or 9, wherein the air data sensors further comprise one or more total air temperature (TAT) probes.

Clause 11. The system of any of Clauses 8-10, wherein the one or more first flush mounted pressure sensors, the one or more MFPs, the one or more AOA vanes, and the one or more second flush mounted pressure sensors are not coupled to pneumatic connections.

Clause 12. A method comprising:
detecting, by air data sensors, one more characteristics of air surrounding an aircraft, wherein at least three of the air data sensors differ in type, and wherein the air data sensors are configured to output air data;

receiving, by a flight control unit in communication with the air data sensors, the air data from the air data sensors;
controlling, by the flight control unit, at least one aspect of the aircraft based on at least a portion of the air data; and voting, by the flight control unit, in relation to the air data from the air data sensors.

Clause 13. The method of Clause 12, wherein said voting comprises voting in relation to redundant signals by selecting a mid-value to prevent an errant signal from affecting a voted output.

Clause 14. The method of Clauses 12 or 13, wherein said voting comprises voting redundant measurements of each type of air data sensor, and providing multiple voted signals of a given parameter to determine if any of the voted signals are corrupted.

Clause 15. The method of any of Clauses 12-14, wherein said voting comprises selecting the types of air data sensors that behave differently in presence of different threats in response to at least two of the types being corrupted.

Clause 16. The method of any of Clauses 12-15, wherein said voting comprises determining that a majority of the air data sensors is corrupted when none of the air data matches.

Clause 17. The method of any of Clauses 12-16, wherein said voting comprises voting two types of the air data sensors, and reserving a third type of the air data sensors as a monitoring signal.

Clause 18. The method of any of Clauses 12-17, further comprising showing the air data on a display.

Clause 19. The method of any of Clauses 12-18, wherein the air data sensors comprise:
one or more first flush mounted pressure sensors;
one or more multi-function probes (MFPs);
one or more pitot probes;
one or more angle of attack (AOA) vanes; and
one or more second flush mounted pressure sensors.

Clause 20. The method of Clause 19, wherein the air data sensors further comprise one or more total air temperature (TAT) probes.

Clause 21. The method of Clauses 19 or 20, wherein the one or more first flush mounted pressure, the one or more MFPs, the one or more AOA vanes, and the one or more second flush mounted pressure sensors are not coupled to pneumatic connections.

Clause 22. An aircraft comprising:
one or more first flush mounted pressure sensors;
one or more multi-function probes (MFPs);
one or more pitot probes;
one or more angle of attack (AOA) vanes;
one or more second flush mounted pressure sensors,
one or more total air temperature (TAT) probes, wherein the one or more first flush mounted pressure sensors, the one or more MFPs, the one or more pitot probes, the one or more AOA vanes, the one or more second flush mounted pressure sensors, and the one or more TAT probes are configured to detect one more characteristics of air surrounding the aircraft and output air data;
a flight control unit in communication with the one or more first flush mounted pressure sensors, the one or more MFPs, the one or more pitot probes, the one or more AOA vanes, the one or more second flush mounted pressure sensors, and the one or more TAT probes, wherein the flight control unit is configured to receive the air data and control at least one aspect of the aircraft based on at least a portion of the air data, and wherein the flight control unit is further configured to vote in relation to the air data; and
a display that shows the air data.

Clause 23. The aircraft of Clause 22, wherein the one or more first flush mounted pressure sensors include a pair of first flush mounted pressure sensors that are about symmetrical with respect to a central longitudinal plane of the aircraft, wherein the one or more MFPs include a pair of MFPs that are about symmetrical with respect to the central longitudinal plane of the aircraft, wherein the one or more pitot probes include a pair of pitot probes that are about symmetrical with respect to the central longitudinal plane of the aircraft, wherein the one or more AOA vanes include a pair of AOA vanes that are about symmetrical with respect to the central longitudinal plane of the aircraft, and wherein the one or more second flush mounted pressure sensors include one or more pairs of second flush mounted pressure sensors that are about symmetrical with respect to the central longitudinal plane of the aircraft.

Clause 24. The aircraft of Clauses 22 or 23, wherein the one or more first flush mounted pressure sensors, the one or more MFPs, the one or more AOA vanes, the one or more second flush mounted pressure sensors, and the one or more TAT probes are not coupled to pneumatic connections.

As described herein, examples of the present disclosure provide improved systems and method for operating an aircraft using air data from air data sensors. Further, examples of the present disclosure provide systems and methods that ensure accurate and reliable air data is received from air data sensors. The systems and methods described herein provide enhanced operational safety through a fail-safe operational flight control system.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including"

and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
air data sensors configured to detect one more characteristics of air surrounding an aircraft, wherein at least three of the air data sensors differ in type, and wherein the air data sensors are configured to output air data, wherein the air data sensors comprise:
one or more first flush mounted pressure sensors;
one or more multi-function probes (MFPs);
one or more pitot probes;
one or more angle of attack (AOA) vanes; and
one or more second flush mounted pressure sensors; and
a flight control unit in communication with the air data sensors, wherein the flight control unit is configured to:
receive the air data from the air data sensors and control at least one aspect of the aircraft based on at least a portion of the air data, and
vote in relation to the air data from the air data sensors, wherein the flight control unit is configured to vote redundant measurements of each type of air data sensor, and provide multiple voted signals of a given parameter to determine if any of the voted signals are corrupted.

2. The system of claim 1, wherein the flight control unit is configured to vote in relation to redundant signals by selecting a mid-value to prevent an errant signal from affecting a voted output.

3. The system of claim 1, wherein the flight control unit is further configured to select the types of air data sensors that respond differently in presence of different threats in response to at least two of the types being corrupted.

4. The system of claim 1, wherein the flight control unit is further configured to determine that a majority of the air data sensors is corrupted when none of the air data matches.

5. The system of claim 1, wherein the flight control unit is configured to vote by voting two types of the air data sensors, and reserving a third type of the air data sensors as a monitoring signal.

6. The system of claim 1, further comprising a display that shows the air data.

7. The system of claim 1, wherein the one or more first flush mounted pressure sensors include a pair of first flush mounted pressure sensors that are about symmetrical with respect to a central longitudinal plane of the aircraft, wherein the one or more MFPs include a pair of MFPs that are about symmetrical with respect to a central longitudinal plane of the aircraft, wherein the one or more pitot probes include a pair of pitot probes that are about symmetrical with respect to a central longitudinal plane of the aircraft, wherein the one or more AOA vanes include a pair of AOA vanes that are about symmetrical with respect to a central longitudinal plane of the aircraft, and wherein the one or more second flush mounted pressure sensors include one or more pairs of second flush mounted pressure sensors that are about symmetrical with respect to a central longitudinal plane of the aircraft.

8. The system of claim 1, wherein the air data sensors further comprise one or more total air temperature (TAT) probes.

9. The system of claim 1, wherein the one or more first flush mounted pressure sensors, the one or more MFPs, the one or more AOA vanes, and the one or more second flush mounted pressure sensors are not coupled to pneumatic connections.

10. A method comprising:
detecting, by air data sensors, one more characteristics of air surrounding an aircraft, wherein at least three of the air data sensors differ in type, and wherein the air data sensors are configured to output air data, wherein the air data sensors comprise:
one or more first flush mounted pressure sensors;
one or more multi-function probes (MFPs);
one or more pitot probes;
one or more angle of attack (AOA) vanes; and
one or more second flush mounted pressure sensors;
receiving, by a flight control unit in communication with the air data sensors, the air data from the air data sensors;
controlling, by the flight control unit, at least one aspect of the aircraft based on at least a portion of the air data; and
voting, by the flight control unit, in relation to the air data from the air data sensors, wherein said voting comprises voting redundant measurements of each type of air data sensor, and providing multiple voted signals of a given parameter to determine if any of the voted signals are corrupted.

11. The method of claim 10, wherein said voting comprises voting in relation to redundant signals by selecting a mid-value to prevent an errant signal from affecting a voted output.

12. The method of claim 10, wherein said voting comprises selecting the types of air data sensors that respond differently in presence of different threats in response to at least two of the types being corrupted.

13. The method of claim 10, wherein said voting comprises determining that a majority of the air data sensors is corrupted when none of the air data matches.

14. The method of claim 10, wherein said voting comprises voting two types of the air data sensors, and reserving a third type of the air data sensors as a monitoring signal.

15. The method of claim 10, further comprising showing the air data on a display.

16. The method of claim 10, wherein the air data sensors further comprise one or more total air temperature (TAT) probes.

17. The method of claim 10, wherein the one or more first flush mounted pressure sensors, the one or more MFPs, the one or more AOA vanes, and the one or more second flush mounted pressure sensors are not coupled to pneumatic connections.

18. An aircraft comprising:
one or more first flush mounted pressure sensors;
one or more multi-function probes (MFPs);
one or more pitot probes;
one or more angle of attack (AOA) vanes;
one or more second flush mounted pressure sensors,
one or more total air temperature (TAT) probes, wherein the one or more first flush mounted pressure sensors, the one or more MFPs, the one or more pitot probes, the one or more AOA vanes, the one or more second flush mounted pressure sensors, and the one or more TAT probes are configured to detect one more characteristics of air surrounding the aircraft and output air data;
a flight control unit in communication with the one or more first flush mounted pressure sensors, the one or more MFPs, the one or more pitot probes, the one or more AOA vanes, the one or more second flush mounted pressure sensors, and the one or more TAT probes, wherein the flight control unit is configured to receive the air data and control at least one aspect of the aircraft based on at least a portion of the air data, and wherein the flight control unit is further configured to vote in relation to the air data, wherein the flight control unit is configured to vote redundant measurements of each type of air data sensor, and provide multiple voted signals of a given parameter to determine if any of the voted signals are corrupted; and
a display that shows the air data.

19. The aircraft of claim 18, wherein the one or more first flush mounted pressure sensors include a pair of first flush mounted pressure sensors that are about symmetrical with respect to a central longitudinal plane of the aircraft, wherein the one or more MFPs include a pair of MFPs that are about symmetrical with respect to the central longitudinal plane of the aircraft, wherein the one or more pitot probes include a pair of pitot probes that are about symmetrical with respect to the central longitudinal plane of the aircraft, wherein the one or more AOA vanes include a pair of AOA vanes that are about symmetrical with respect to the central longitudinal plane of the aircraft, and wherein the one or more second flush mounted pressure sensors include one or more pairs of second flush mounted pressure sensors that are about symmetrical with respect to the central longitudinal plane of the aircraft.

20. The aircraft of claim 18, wherein the one or more first flush mounted pressure sensors, the one or more MFPs, the one or more AOA vanes, the one or more second flush mounted pressure sensors, and the one or more TAT probes are not coupled to pneumatic connections.

* * * * *